(12) United States Patent
Shihab et al.

(10) Patent No.: US 11,741,465 B2
(45) Date of Patent: Aug. 29, 2023

(54) SYSTEMS AND METHODS FOR GENERATING PRE-CHARGEBACK DISPUTE RECORDS

(71) Applicant: MASTERCARD INTERNATIONAL INCORPORATED, Purchase, NY (US)

(72) Inventors: Samy Shihab, Saint Charles, MO (US); Kyle Williams, Wentzville, MO (US); David J. Senci, Troy, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 389 days.

(21) Appl. No.: 16/402,030

(22) Filed: May 2, 2019

(65) Prior Publication Data
US 2020/0349567 A1 Nov. 5, 2020

(51) Int. Cl.
*G06Q 20/40* (2012.01)
*G06F 16/903* (2019.01)

(52) U.S. Cl.
CPC ......... *G06Q 20/401* (2013.01); *G06F 16/903* (2019.01); *G06Q 20/407* (2013.01)

(58) Field of Classification Search
CPC .. G06Q 20/401; G06Q 20/407; G06F 16/903; G06F 9/54
USPC .......................................................... 705/75
See application file for complete search history.

(56) References Cited

U.S. PATENT DOCUMENTS

| | | |
|---|---|---|
| 6,783,065 B2 | 8/2004 | Spitz |
| 6,892,184 B1 | 5/2005 | Komem |
| 7,251,624 B1 | 7/2007 | Lee |
| 7,356,516 B2 | 4/2008 | Richey et al. |
| 7,464,057 B2 | 12/2008 | Cole |
| 7,689,483 B2 | 3/2010 | Wu |
| 7,865,427 B2 | 1/2011 | Wright |
| 8,626,660 B2 | 1/2014 | Beck |
| 8,655,782 B2 | 2/2014 | Poon |

(Continued)

OTHER PUBLICATIONS

PCT International Search Report and Written Opinion, Application No. PCT/US2017/032121, dated Jun. 26, 2017, 10 pps.

(Continued)

*Primary Examiner* — Courtney P Jones
(74) *Attorney, Agent, or Firm* — Armstrong Teasdale LLP

(57) ABSTRACT

An insight data computing system for generating a pre-chargeback record for a payment transaction between a customer and a merchant is provided. The payment transaction is authorized over a payment processing network based on transaction data submitted over the payment processing network. The transaction data is stored by the payment processing network in a historical transaction database. The insight data computing system includes an insight data interface computing device programmed to (i) receive, via an insight communication channel other than the payment processing network, an insight data message including insight data and transaction link data, (ii) store the insight data in an insight database, (iii) link the insight data to the transaction data by matching the transaction link data in the insight data to the transaction data in the historical transaction database, and (iv) generate the pre-chargeback record including the transaction data and the linked insight data.

20 Claims, 4 Drawing Sheets

(56) References Cited

U.S. PATENT DOCUMENTS

| | | | |
|---|---|---|---|
| 8,740,069 B2 | 6/2014 | Choy | |
| 9,984,367 B2 | 5/2018 | Jain | |
| 10,832,248 B1* | 11/2020 | Kramme | G06K 9/66 |
| 2010/0114774 A1 | 5/2010 | Linaman | |
| 2011/0196791 A1 | 8/2011 | Dominguez | |
| 2011/0246357 A1 | 10/2011 | Young | |
| 2012/0005054 A1 | 1/2012 | Agarwal | |
| 2014/0006264 A1 | 1/2014 | Powell | |
| 2014/0074675 A1* | 3/2014 | Calman | G06Q 20/047 |
| | | | 705/35 |
| 2014/0095393 A1 | 4/2014 | Nightengale | |
| 2014/0279312 A1* | 9/2014 | Mason | G06Q 20/407 |
| | | | 705/30 |
| 2015/0012430 A1 | 1/2015 | Chisholm | |
| 2015/0235206 A1 | 8/2015 | Murphy, Jr. | |
| 2016/0034906 A1* | 2/2016 | Stopic | G06Q 30/016 |
| | | | 705/30 |
| 2016/0148212 A1* | 5/2016 | Dimmick | G06Q 20/386 |
| | | | 705/44 |
| 2016/0180343 A1 | 6/2016 | Poon | |
| 2016/0247155 A1* | 8/2016 | Hammad | G06Q 20/1085 |
| 2016/0300214 A1* | 10/2016 | Chaffin | G06Q 20/22 |
| 2016/0364959 A1* | 12/2016 | Giddy | G06Q 30/04 |
| 2016/0379216 A1 | 12/2016 | Wang | |
| 2017/0103399 A1* | 4/2017 | Napsky | G06Q 30/0609 |
| 2017/0200142 A1 | 7/2017 | Pappano | |
| 2017/0221062 A1* | 8/2017 | Katz | G06Q 20/389 |
| 2017/0330196 A1 | 11/2017 | Larko | |
| 2018/0032876 A1 | 2/2018 | Altshuller | |
| 2018/0218384 A1 | 8/2018 | Cook | |
| 2019/0095789 A1* | 3/2019 | Stopic | G06N 5/022 |
| 2019/0147417 A1* | 5/2019 | Arora | G06Q 20/10 |
| | | | 705/39 |
| 2019/0362347 A1* | 11/2019 | Swaminathan | G06Q 20/407 |
| 2020/0118230 A1* | 4/2020 | Woelfer | G06Q 20/047 |
| 2020/0273039 A1* | 8/2020 | Mathur | G06Q 20/389 |
| 2021/0049606 A1* | 2/2021 | Garcia | G06Q 30/0601 |

OTHER PUBLICATIONS

"PhoneID", Webpage, TeleSign, archived on Sep. 9, 2018 at URL: https://web.archive.org/web/20180909165323/https://www.telesign.com/products/phone-id/.

* cited by examiner

SYSTEMS AND METHODS FOR GENERATING PRE-CHARGEBACK DISPUTE RECORDS

BACKGROUND

The present application relates generally to chargeback disputes and, more specifically, to a network-based system and method for generating supporting documentation to reduce conventional chargeback disputes.

On occasion, a cardholder (i) may be unsatisfied with the goods or services provided by a merchant, (ii) may not recognize a purchase on the cardholder's bill, (iii) may determine a purchase on the bill is fraudulent, or (iv) may otherwise dispute the transaction. In these examples, the cardholder may initiate a transaction dispute over the payment processing network, known as a chargeback, with the issuing bank. The chargeback may be used to return some or all of the funds associated with the disputed transaction to the account corresponding to the cardholder's payment card. Typically, the issuing bank immediately issues a credit to the account for the amount of the transaction. The issuing bank then sends a chargeback request to an issuing bank processor, and the request is collected with other requests and submitted in a batch to the payment processing network server. The chargeback request is then sent to the acquiring bank or an acquirer processor. However, the merchant may dispute the chargeback with the assistance of the acquiring bank. The issuing bank and the acquiring bank may then attempt to mediate the charge through an arbitration proceeding. Depending on the outcome of the conventional chargeback procedure, the cardholder, the issuing bank, the acquiring bank, or the merchant may be left with the cost of the transaction.

In conventional payment systems, it is difficult to resolve transaction disputes for certain purchases due to a lack of contemporaneous documentation. For example, with telephone purchases or telephone orders (e.g., where a customer calls a merchant to purchase a good and/or service), generally little to no background information regarding the customer is captured by the merchant. Thus, when a cardholder later disputes a telephone payment transaction, the merchant has little supporting documentation to dispute a chargeback. The chargeback procedure is typically complicated, consumes messaging bandwidth and computing resources of the payment processing network, and is costly to all participants involved. Accordingly, it is desirable to have a system that enables parties to settle at least some such disputes in a simpler pre-chargeback process with ample supporting documentation, such as for telephone payment transactions, to allow at least some payment transaction disputes to be resolved without having to use payment processing network server resources associated with a conventional chargeback procedure.

BRIEF DESCRIPTION

In one aspect, an insight data computing system for generating a pre-chargeback record for a payment transaction between a customer and a merchant is provided. The payment transaction is authorized over a payment processing network based on transaction data submitted over the payment processing network. The transaction data is stored by the payment processing network in a historical transaction database. The insight data computing system includes an insight data interface (IDI) computing device. The insight data interface computing device includes a memory device for storing data and at least one processor communicatively coupled to the memory device. The at least one processor is programmed to receive, via an insight communication channel other than the payment processing network, an insight data message including insight data and transaction link data. The insight data is collected by the merchant during the payment transaction, and includes at least one of a telephone number of the customer and an email address of the customer. The transaction link data includes at least a portion of the transaction data. The at least one processor is also programmed to store the insight data in an insight database. The at least one processor is further programmed to link the insight data in the insight database to the transaction data by matching the transaction link data in the insight data to the transaction data in the historical transaction database. The at least one processor is also programmed to generate the pre-chargeback record including the transaction data and the linked insight data. The insight data computing system is further configured to transmit the pre-chargeback record to an issuer of the payment card account in response to a pre-chargeback retrieval request from the issuer.

In another aspect, a computer-implemented method for generating a pre-chargeback record for a payment transaction between a customer and a merchant is provided. The computer-implemented method utilizes an insight data interface (IDI) computing device comprising at least one processor communicatively coupled to a memory device. The payment transaction is authorized over a payment processing network based on transaction data submitted over the payment processing network. The transaction data is stored by the payment processing network in a historical transaction database. The method includes receiving, at the IDI computing device, via an insight communication channel other than the payment processing network, an insight data message including insight data and transaction link data. The insight data is collected by the merchant during the payment transaction and includes at least one of a telephone number of the customer and an email address of the customer. The transaction link data includes at least a portion of the transaction data. The method also includes storing the insight data in an insight database. The method further includes linking, by the IDI computing device, the insight data in the insight database to the transaction data by matching the transaction link data in the insight data message to the transaction data in the historical transaction database. The method also includes generating, at the IDI computing device, the pre-chargeback record including the transaction data and the linked insight data. The method further includes transmitting the pre-chargeback record to an issuer of the payment card account in response to a pre-chargeback retrieval request from the issuer.

In yet another aspect, at least one non-transitory computer-readable storage media that includes computer-executable instructions for generating a pre-chargeback record for a payment transaction between a customer and a merchant is provided. The payment transaction is authorized over a payment processing network based on transaction data submitted over the payment processing network. The transaction data is stored by the payment processing network in a historical transaction database. When executed by an insight data interface (IDI) computing device, the computer-executable instructions cause the IDI computing device to receive, via an insight communication channel other than the payment processing network, an insight data message including insight data and transaction link data. The insight data is collected by the merchant during the payment transaction and includes at least one of a telephone number of the customer and an email address of the customer. The transaction link data includes at least a portion of the transaction data. The computer-executable instructions further cause the IDI computing device to store the insight data in an insight database. The computer-executable instructions further cause the IDI computing device to link the insight data in the insight database to the transaction data by matching the transaction link data in the insight data message to the transaction data in the historical transaction database. The computer-executable instructions further cause the IDI computing device to generate the pre-chargeback record including the transaction data and the linked insight data.

BRIEF DESCRIPTION OF THE DRAWINGS

FIG. 1 is a flow diagram illustrating a purchase transaction through a payment card processing network in which supplemental information is collected through an example insight data computing system.

FIG. 2 is a flow diagram illustrating an example generation of a pre-chargeback record through the payment card processing network using the insight data computing system shown in FIG. 1.

FIG. 3 is a simplified block diagram illustrating an example structure of the pre-chargeback record generated in FIG. 2.

FIG. 4 is a diagram of components of one or more example computing devices that may be used in the insight data computing system shown in FIG. 1.

Figure 1:
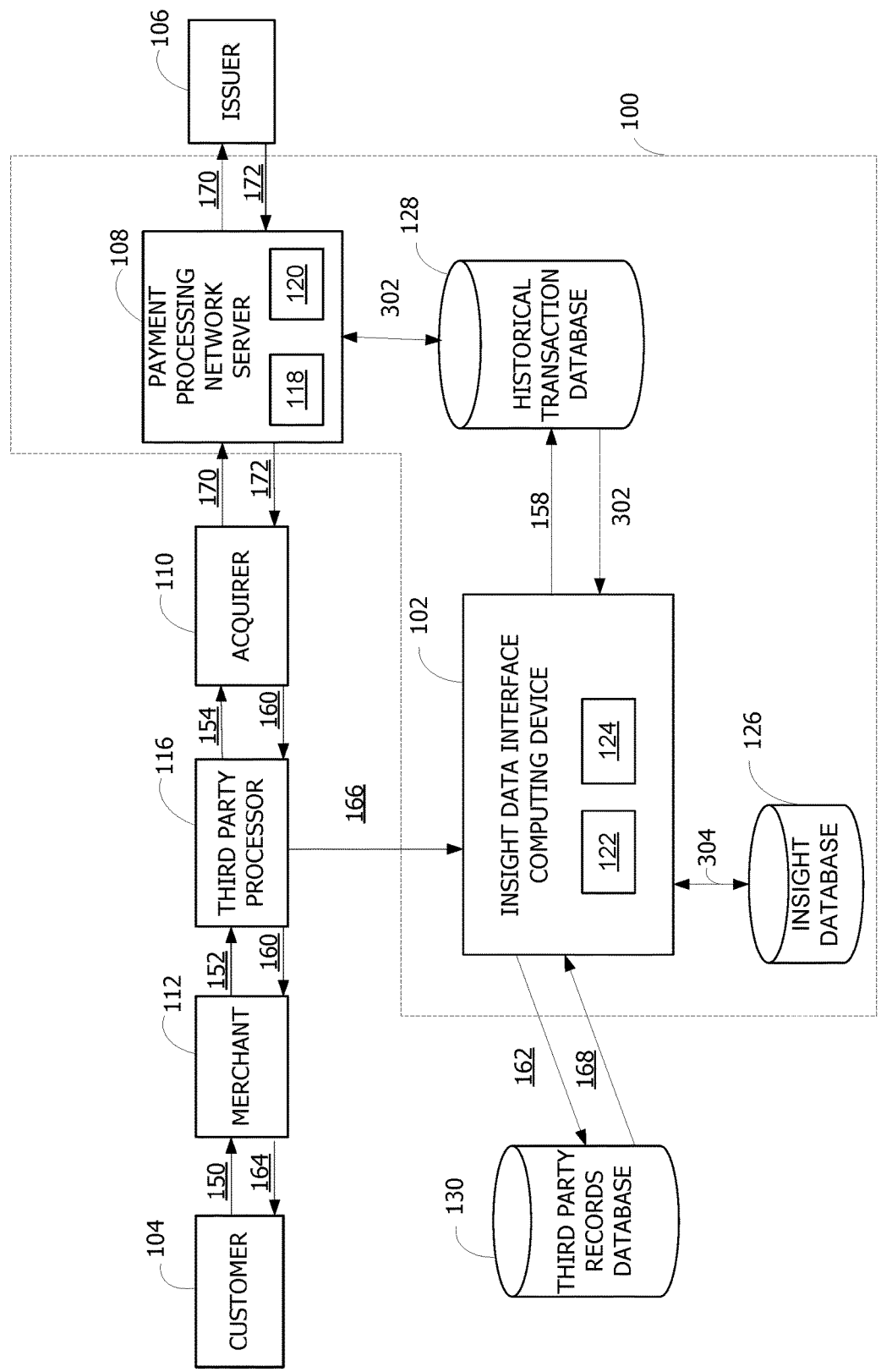
FIGS. 1-4 show example embodiments of the methods and systems described herein.

Like numbers in the Figures indicate the same or functionally similar components. Although specific features of various embodiments may be shown in some figures and not in others, this is for convenience only. Any feature of any figure may be referenced and/or claimed in combination with any feature of any other figure.

DETAILED DESCRIPTION

The systems and methods according to this disclosure are directed to generating pre-chargeback records for a payment transaction between a merchant and a customer conducted over a payment card processing network. Specifically, pre-chargeback records are generated for transactions such as telephone payment transactions conducted over a mobile computing device of a customer. In one example embodiment, the systems and methods may be performed by an insight data interface (IDI) computing device.

The insight data computing system enables resolution of transaction disputes, such as for telephone payment transactions, before or without conducting a conventional chargeback procedure over the payment card processing network. The pre-chargeback process enabled by the insight data computing system thus reduces messaging traffic processed by the payment card processing network and use of computing resources of the payment card processing network, as compared to the traditional chargeback dispute resolution process, by making available to issuers ample supporting documentation as to, for example, telephone payment transactions, enabling issuers to determine whether a payment transaction dispute is worthy of the conventional chargeback procedure.

In the example embodiment, a merchant receives a purchase order from a customer for a purchase, such as over the telephone (e.g., telephone payment transaction where the customer calls the merchant to make the purchase). When the customer calls the merchant, the merchant may input information provided by the customer into a merchant-operated computing device. The merchant-operated computing device may be a point-of-sale (POS) terminal. A POS terminal is a computer configured to communicate with a payment card processing network server using an ISO 8583 network messaging protocol or an equivalent messaging protocol. In the example embodiment, the merchant-operated computing device may be a user computing device, such as a tablet and/or a mobile computing device, which includes a digital POS terminal, such as a specific POS software application ("app"). The app may be provided by a third-party processor or an acquiring bank of the merchant. In the example embodiment, the merchant may input, into the merchant-operated computing device, customer information (e.g., customer data), such as a customer's phone number, payment information (e.g., payment card data), billing information associated with the payment card (e.g., billing address), and/or email address. The merchant may also input transaction information (e.g., transaction data) related to the item and/or service being purchased, including a transaction amount, a purchase item identifier, and/or a merchant identifier. In known systems, however, only a certain subset of the collected information (e.g., payment card account number or token account number, transaction amount, transaction date/time) is submitted from the POS device to the payment card processing network, and thence to the issuer of the payment card used by the customer, via the ISO 8583 network messaging protocol or the equivalent messaging protocol. Moreover, in known systems, only the subset of information is stored by the payment card processing network in a historical transaction database. Thus, should a transaction later be disputed, in known systems the supplemental information collected by the merchant is not available for review by the issuer to help determine whether the transaction was legitimate prior to initiating the traditional, resource-intensive chargeback process.

The IDI computing device is an unconventional, special-purpose computing device that adds new functionality to the legacy payment card processing network, transforming the combination into the insight data computing system. In particular, supplemental or "insight" information captured by the merchant is transmitted to the IDI computing device via a separate messaging channel, such as through an Application Programming Interface (API) call over the Internet. The IDI computing device is configured to link the supplemental "insight" information to the transaction data stored in the legacy historical transaction database and, in response to a subsequent pre-chargeback request from the issuer, generate a pre-chargeback record with both the legacy historical transaction data and the insight data.

For example, the merchant may receive a call from a customer who is placing an order for flowers. In this example, the merchant may input, into the merchant-operated computing device, transaction information related to the order, including a type of flower and quantity for purchase, a delivery/pick-up date and time, and a purchase price. The merchant may subsequently ask the customer for payment information, a contact phone number, and an email address to send a receipt and/or a confirmation email. The customer-provided information and the transaction information are all inputted into the merchant-operated computing device.

In some embodiments, the merchant may automatically capture the phone number from which the customer is calling to purchase the item and/or service. For example, the merchant may receive phone orders from a landline and/or a mobile computing device separate from the merchant's POS terminal. The landline and/or mobile computing device may include a caller identification (e.g., caller ID) service that automatically displays and/or stores the phone number from which the customer's call was made from. In this example, the merchant may input the captured phone number into the POS terminal along with a contact number that is verbally provided by the customer. The merchant may ask the customer for a customer callback number and/or confirm whether the captured phone number is a good callback number to contact the customer. Thus, in some embodiments, the merchant may input more than one customer phone number (e.g., a captured phone number from which the call was made, and a customer callback number with which to contact the customer) into the merchant-operated computing device.

At checkout, the merchant transmits (i) an authorization request message to a payment card processing network server for authorization, using the ISO 8583 network messaging protocol or the equivalent payment card processing network messaging protocol, and (ii) an insight data message over an insight communication channel to the IDI computing device. The authorization request message is separate from the insight data message. Moreover, the authorization request message is transmitted over a network that is different from the network used to transmit the insight data message. In the example embodiment, the IDI computing device receives insight data messages via the insight communication channel by receiving Application Programming Interface (API) calls via the Internet. In some embodiments, the IDI computing device is in communication with or is a part of a payment card processing network. In other embodiments, the IDI computing device of the insight data computing system is integrated with an issuer server (e.g., server associated with the issuing bank).

The insight data message includes insight data and transaction link data. The transaction link data includes at least a portion of the transaction data transmitted to the payment card processing network server. Accordingly, the insight data message includes data that overlaps with the transaction data transmitted in the authorization request message. For example, both the insight data message and the authorization request message may include a unique transaction identifier and/or other matching transaction data, such as the customer's payment account identifier.

The transaction link data may include a transaction identifier and transaction data, including an account identifier of a payment card account, such as a primary account number (PAN) associated with the payment card used in the transaction. The transaction link data may further include a transaction amount, a transaction date and/or transaction time stamp, and purchase identification information associated with the goods or services purchased (e.g., a goods or services category). The insight data includes customer information data and data associated with the customer's mobile computing device, as captured by the merchant during the transaction. In the example embodiment, the insight data includes a customer phone number involved in the telephone payment transaction and/or a customer callback number. Additionally or alternatively, the insight data includes other customer contact information, such as a customer email address and/or a mailing address.

The insight data is stored in an insight database of the insight data computing system. In some embodiments, the IDI computing device of the insight data computing system is in communication with records databases of third party providers. Third party providers are publically available records services that provide additional information associated with a phone number or an email address. In the example embodiment, the IDI computing device is in communication with a third party records database that provides telephone identification services. The IDI computing device may parse the customer's phone number from a corresponding data field of the insight data message, and subsequently utilize the parsed phone number to query the third party records database and retrieve augmented insight data, such as phone intelligence data associated with the parsed phone number from the third party records database.

The retrieved phone intelligence data includes data associated with the mobile computing device registered with the parsed phone number. The retrieved phone intelligence data may include location data, such as a GPS (Global Positioning System) location of the telephone number at the time of the phone call to the merchant. The retrieved telephone intelligence data may also include, but is not limited to, data as to an owner of the telephone number (e.g., full name and home address of the person who owns the parsed number), a phone line type (e.g., landline, cellular, Voice Over Internet Protocol (VoIP)), a phone type (e.g., prepaid, postpaid, residential), phone carrier information (e.g., carrier name), status (e.g., whether a phone number is active, length of time in service, deactivated, suspended), and data as to the mobile computing device used to make the call (e.g., an IMEI (International Mobile Equipment Identity) number, phone make, and phone model).

Additionally or alternatively, the IDI computing device parses a customer's email address from a corresponding data field of the insight data message. In these embodiments, the IDI computing device utilizes the parsed email address to retrieve additional augmented insight data, such as email intelligence data from a third party records database that provides email intelligence data. The retrieved email intelligence data includes, but is not limited to, data as to whether an email address is valid (e.g., does the email address exist), length of time in service, and data as to how risky the email address is (e.g., associated with spam, malware, and/or phishing). Additionally or alternatively, augmented intelligence data may be retrieved for a mailing address provided by the customer from a third party records database.

The IDI computing device generates a pre-chargeback record for the payment transaction using the insight data message and the transaction data stored in the legacy historical transaction database of the payment card processing network. In other words, the pre-chargeback record includes both insight data from the insight data message and transaction data from the historical transaction database. In further embodiments, the pre-chargeback record may also include augmented insight data retrieved from third party records databases, as described above, such as retrieved phone intelligence data, email intelligence data, and/or any other intelligence data.

In the example embodiment, the insight data computing system includes a payment card processing network server in communication with the IDI computing device. More specifically, the payment card processing network server transmits the transaction data acquired via the payment card authorization process to the historical transaction database. In some embodiments, the historical transaction database is associated with the payment card processing network. The historical transaction database includes transaction data records for each payment card transaction processed over the payment card processing network. Each transaction data record includes data as to the authorization, clearing, and settlement processes. Transaction data records may also include fraud-related data associated with each payment card transaction processed over the payment card processing network. Transaction data records may include transaction data that includes, but is not limited to, a primary account number (PAN) associated with a payment card used to initiate the transaction, account profile data for the PAN, a merchant identifier (ID), an acquiring bank identifier, an issuing bank ID, an original transaction amount, a transaction date and time, a merchant location ID, a card product type, a merchant category code, an authorization code, and/or other transaction identifiers that may be used to identify the merchant and/or the transaction.

The IDI computing device is in communication with the insight database and the historical transaction database. The IDI computing device links the insight data associated with a particular transaction to a transaction data record stored in the historical transaction database by utilizing the transaction link data from the insight data message. In some embodiments, the transaction link data is stored along with the insight data in the insight database. In other embodiments, the transaction link data is converted into a transaction link identifier. In these embodiments, the transaction link identifier may be used to link insight data to a particular transaction data record stored within the historical transaction database.

In the example embodiment, the IDI computing device links insight data to transaction data of a particular transaction data record by matching the transaction link data to transaction data stored within the historical transaction database. For example, the IDI computing device may utilize unique transaction identifiers to locate a particular transaction data record. Additionally or alternatively, the IDI computing device may extract data fields corresponding to transaction-based elements (e.g., a transaction amount, transaction date/time, and/or a PAN) from the insight data record within the insight database to identify a corresponding transaction data record stored within the historical transaction database. Once a match is found, the IDI computing device may generate a pre-chargeback record that includes insight data from the insight data record and transaction data from the corresponding transaction data record. In the example embodiment, the pre-chargeback record is generated in response to a pre-chargeback retrieval request from an issuer. Alternatively, the pre-chargeback record is prior to any pre-chargeback retrieval request from an issuer and saved for potential future use.

Accordingly, when a cardholder subsequently disputes a payment card transaction, the issuer has access to review support documentation regarding the payment card transaction as embodied in a single convenient data record. An issuer (e.g., issuing bank) associated with the cardholder may transmit a pre-chargeback retrieval request to the IDI computing device via the payment card processing network. In response, the IDI computing device may retrieve and transmit a pre-chargeback data record for the particular transaction to the issuer. The issuer may review the retrieved pre-chargeback data record, and then determine to submit the disputed payment card transaction through the conventional chargeback procedure only in cases in which the pre-chargeback record data suggests the transaction was not legitimate.

The technical effects achieved by the systems and methods described herein include collecting insight data captured by a merchant during a payment card transaction and/or augmented insight data from third-party records databases, and providing the insight data to issuers for resolving subsequent cardholder disputes prior to or without submitting the disputed payment transactions through the conventional chargeback procedure over the payment card processing network, thus reducing messaging traffic processed by the payment card processing network and use of computing resources of the payment card processing network, as compared to the traditional chargeback dispute resolution process. The insight data computing system described herein enables issuers to readily resolve these disputes by providing issuers with ample support documentation with respect to payment card transactions. Issuers are able to review not only transaction data stored in legacy historical transaction databases, but also insight data associated with the customer or customer device associated with the transaction.

When a cardholder notifies an issuer of a dispute with regard to a payment card transaction, the issuer may review data provided by the insight data computing system to determine, for instance, (i) whether a customer name provided by the customer at checkout matches the cardholder's name; (ii) whether a name associated with the phone number captured by the merchant, for example, using caller ID, matches the cardholder's name, (iii) a location from where the phone call was placed at the time of the telephone payment transaction, (iv) whether an address associated with the mobile computing device used to make the call is the same as the address on file for the cardholder, and (v) whether an email address provided to the merchant is the same as the email address on file for the cardholder. Thus an issuer may be able to determine, from the provided information, whether a disputed telephone payment transaction is likely to be an illegitimate transaction.

For example, returning to the previously discussed scenario, a cardholder may deny ordering flowers over the telephone. The cardholder's issuer may determine from the insight data in the pre-chargeback record that the name associated with the phone number from which the order was placed is the same name as the cardholder. The issuer may also determine from the insight data in the pre-chargeback record that the location of the telephone at the time the order was placed was within 3 miles of the cardholder's home address. From this information, the issuer may decide not to move forward with the dispute (e.g., not submit the dispute as a chargeback to the payment card processing network). Alternatively, the cardholder's issuer may determine from the insight data in the pre-chargeback record that the phone used to place the order is registered under a name different from that of cardholder's, and that the call was made from a location that is 500 miles away from the cardholder's home address. In this example, the issuer may decide that, given the information, the disputed transaction appears to be a fraudulent transaction. The issuer then decides to move forward with the dispute, and submits the dispute through the conventional chargeback procedure. Thus, the insight data computing system reduces the number of chargebacks submitted to the payment card processing network server, thereby freeing up payment card processing network resources and bandwidth and increasing a speed of processing the fewer conventional chargeback procedures that are submitted to the payment card processing network server. In addition, reducing the number of chargebacks may lead to reducing a number of issuer declines.

The methods and systems directed to the insight data computing system described herein may be implemented using computer programming or engineering techniques including computer software, firmware, hardware or any combination or subset thereof, wherein the technical effect may be achieved by performing at least one of the following steps: (a) receiving, via an insight communication channel other than the payment card processing network, an insight data message including insight data and transaction link data, wherein the insight data is collected by a merchant during a payment transaction and includes at least one of a telephone number of a customer and an email address of the customer, and wherein the transaction link data includes at least a portion of transaction data submitted by the merchant via a payment card processing network; (b) storing the insight data in an insight database; (c) linking the insight data in the insight database to the transaction data by matching the transaction link data in the insight data to transaction data stored in a historical transaction database; and (d) generating the pre-chargeback record including the transaction data and the linked insight data, where the pre-chargeback record may be transmitted to an issuer of a payment card account in response to a pre-chargeback retrieval request from the issuer.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality. The following detailed description illustrates embodiments of the disclosure by way of example and not by way of limitation. It is contemplated that the disclosure has general application to providing a pre-chargeback analysis (PA) computing system to resolve transaction disputes for telephone payment transactions between cardholders and merchants during a pre-chargeback process, thus providing an alternative to the chargeback process.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PCAs), and key fobs.

FIG. 1 is a flow diagram illustrating a purchase transaction through a payment card processing network in which supplemental information is collected through an example insight data computing system 100. In particular, FIG. 1 depicts the flow of data for payment transaction including both (i) a payment card authorization request message 170 via a payment card network server 108, and (ii) an insight data message 166 to an insight data interface (IDI) computing device 102 a via an insight communication channel that is different from, and separate from, the payment card processing network. In particular, IDI computing device 102 generates a pre-chargeback record for a payment transaction, such as a telephone transaction conducted over a mobile computing device of the customer. In the example embodiment, insight data computing system 100 also includes an insight database 126 and a historical transaction database 128. More specifically, IDI computing device 102 includes at least one processor 122 in communication with a memory 124. Additionally or alternatively, memory 124 may include insight database 126 and/or a database server (not shown).

Payment card processing network server 108 is part of the payment card processing network, such as the Mastercard® credit card payment network. The Mastercard® payment processing network is a proprietary communications standard promulgated by Mastercard International Incorporated® for the exchange of financial transaction data between financial institutions that are registered with Mastercard International Incorporated®. (Mastercard is a registered trademark of Mastercard International Incorporated located in Purchase, N.Y.). In the payment card processing network, an issuer 106, typically a financial institution such as an issuing bank, issues a payment card, such as a credit card account or a debit card account, to a customer 104, who uses the payment card to tender payment for a purchase from a merchant 112. To accept payment with the payment card, merchant 112 must normally establish an account with a financial institution that is part of the financial payment system. This financial institution is usually called the "merchant bank" or the "acquiring bank" or simply "acquirer" 110. In some embodiments, merchant 112 communicates with acquirer 110 through a third party processor 116 authorized by acquirer 110 to perform transaction processing on its behalf. Third party processor 116 is sometimes referred to as a "merchant processor" or an "acquiring processor."

As part of a payment card transaction, customer 104 provides customer-submitted information 150, such as payment information or billing data associated with the payment card, electronically or verbally to merchant 112. For example, customer-submitted information 150 includes payment card information (e.g., a PAN associated with a credit card or debit card account) and customer information, such as a phone number and/or an email address. Customer-submitted information 150 may include additional customer information, such as a mailing address, alternate phone number, and/or social media username. In the example embodiment, customer 104 provides customer-submitted information 150 over the telephone (e.g., customer 104 verbally provides customer-submitted information 150 to merchant 112, and merchant 112 enters the information into a point-of-sale application on a merchant computing device). Alternatively, customer 104 enters customer-submitted information 150 into a merchant-provided web page, or provides customer-submitted information 150 in any suitable fashion.

In the example embodiment, merchant 112 utilizes a merchant computing device, such as a point-of-sale (POS) terminal or a computer that includes a digital POS terminal. For example, the merchant computing device is a computer including a web browser or a software application (e.g., provided by third party processor 116) that enables the merchant computing device to be in communication with third party processor 116 (or, alternatively, directly with IDI computing device 102) using the Internet. More specifically, merchant computing devices may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Merchant computing devices may be any device capable of interconnecting to the Internet including a mobile computing device, such as a laptop or desktop computer, a web-based phone (e.g., a "smartphone"), a personal digital assistant (PDA), a tablet or phablet, a fitness wearable device, a smart refrigerator or other web-connectable appliance, a "smart watch" or other wearable device, or other web-connectable equipment.

In the example embodiment, merchant 112 transmits merchant-captured information 152, including customer-submitted information 150, to third party processor 116. Merchant-captured information 152 includes transaction data 154 and insight data 162. Transaction data 154 includes, for example, a payment card account number included in customer-submitted information 150, a transaction amount, a transaction date and time, and a merchant category identifier. Insight data 162 includes, for example, an email address 312, a mailing address 314, and/or a phone number 316 (shown in FIG. 3) from customer-submitted information 150. For example, merchant 112 transmits merchant-captured information 152 to third party processor 116 over the Internet via an Application Program Interface (API) call generated by a web page or a point-of-sale application provided by third party processor 116. Alternatively, merchant 112 transmits merchant-captured information 152 to third party processor 116 in any suitable fashion. Alternatively, merchant 112 does not use a third party processor 116. For example, merchant 112 transmits transaction data 154 directly to acquirer 110 via a point-of-sale device connected to the payment card processing network and transmits insight data 162 directly to IDI computing device 102 over the Internet via an API call in insight data message 166.

In the example embodiment, third party processor 116 subsequently transmits transaction data 154 to acquirer 110 over the payment card processing network, and transmits insight data message 166 to IDI computing device 102 via an insight communication channel other than the payment card processing network. For example, the insight communication channel is an API call over the Internet.

Acquirer 110 transmits transaction data 154 in an authorization request message 170 to payment card processing network server 108. In the example embodiment, payment card processing network server 108 is associated with and/or integral to the payment card processing network. In the example embodiment, authorization request message 170 is formatted according to ISO 8583 network messaging protocol or the equivalent messaging protocol used by the payment card processing network, thus ensuring that insight data computing system 100 functions in concert with legacy payment card processing network systems. Payment card processing network server 108 performs any suitable processing operations and subsequently forwards authorization request message 170 to issuer 106 for authorization of the transaction. In other words, using payment card processing network server 108, the computers of acquirer 110 communicate with the computers of issuer 106 to determine whether the cardholder account identified in authorization request message 170 is in good standing and whether the purchase is covered by the available credit line or account balance for the cardholder account. Based on these determinations, issuer 106 declines or accepts the authorization request. If the request is accepted, the transaction is given a bank network reference number, such as the Banknet Reference Number used by Mastercard International Incorporated®, an authorization code, and/or other transaction identifiers that may be used to identify the transaction.

Payment card processing network server 108 includes at least one processor 118 for executing instructions and a memory 120 in communication with the at least one processor 118 for storing the executable instructions. Processor 118 may include one or more processing units (e.g., in a multi-core configuration). Memory 120 is any device allowing information such as executable instructions and/or other data to be stored and retrieved. Memory 120 may include one or more computer-readable media. Processor 118 is operatively coupled to a communication interface (not shown) such that payment card processing network server 108 is capable of communicating with remote computing devices, such as acquirer 110, issuer 106, IDI computing device 102, or another server computing device. Processor 118 also is operatively coupled to a database interface (not shown) such that payment card processing network server 108 is capable of communicating with historical transaction database 128.

In response to accepting the request for authorization in authorization request message 170, issuer 106 transmits to payment card processing network server 108 an authorization response message 172 indicating approval of the subject payment transaction. In the example embodiment, authorization response message 172 is formatted according to ISO 8583 network messaging protocol or the equivalent messaging protocol used by the payment card processing network After performing any suitable processing operations, payment card processing network server 108 subsequently transmits authorization response message 172 to acquirer 110, and the available credit line or available account balance of the cardholder account is decreased. Acquirer 110 transmits transaction approval 160 to third party processor 116 or, alternatively, directly to merchant 112 (such as to a merchant point-of-sale device). Third party processor 116 transmits transaction approval 160 to merchant 112, notifying merchant 112 that the transaction has been authorized. Merchant 112 subsequently provides to customer 104, the good or service 164 purchased by customer 104 to complete the payment transaction.

Normally, a charge is not posted immediately to the cardholder account because bankcard associations, such as Mastercard International Incorporated®, have promulgated rules that do not allow a merchant to charge, or "capture," a transaction until goods are shipped or services are delivered. When merchant 112 ships or delivers the goods or services, merchant 112 captures the transaction by, for example, appropriate data entry procedures on the point-of-sale terminal or application provided by third party processor 116. If customer 104 cancels a transaction before it is captured, a "void" is generated. If customer 104 returns goods after the transaction has been captured, a "credit" is generated. Payment card processing network server 108 and/or issuer 106 stores the transaction data, such as a category of merchant, a merchant identifier, a location where the transaction was completed, amount of purchase, date and time of transaction in a database, such as historical transaction database 128.

A clearing process transfers transaction data related to the purchase among the parties to the transaction, such as acquirer 110, payment card processing network server 108, and issuer 106. No money is exchanged during the clearing process. Clearing involves the exchange of data required to identify the cardholder account such as the account number, expiration date, billing address, amount of the sale, and/or other transaction identifiers that may be used to identify the transaction. Along with this data, banks in the United States also include a bank network reference number, such as the Banknet Reference Number used by Mastercard International Incorporated®, which identifies that specific transaction. When issuer 106 receives this data, it posts the amount of sale as a draw against the 104 available credit of the cardholder account and prepares to send payment to the acquirer 110.

After a transaction is captured, the transaction is settled between merchant 112, acquirer 110, and issuer 106. Settlement refers to the transfer of financial data or funds between the merchant's account, acquirer 110, and issuer 106 related to the transaction. Usually, transactions are captured and accumulated into a "batch," which is settled as a group. More specifically, a transaction is typically settled between issuer 106 and payment card processing network server 108, and then between payment card processing network server 108 and acquirer 110, and then between acquirer 110 and merchant 112.

Figure 3:
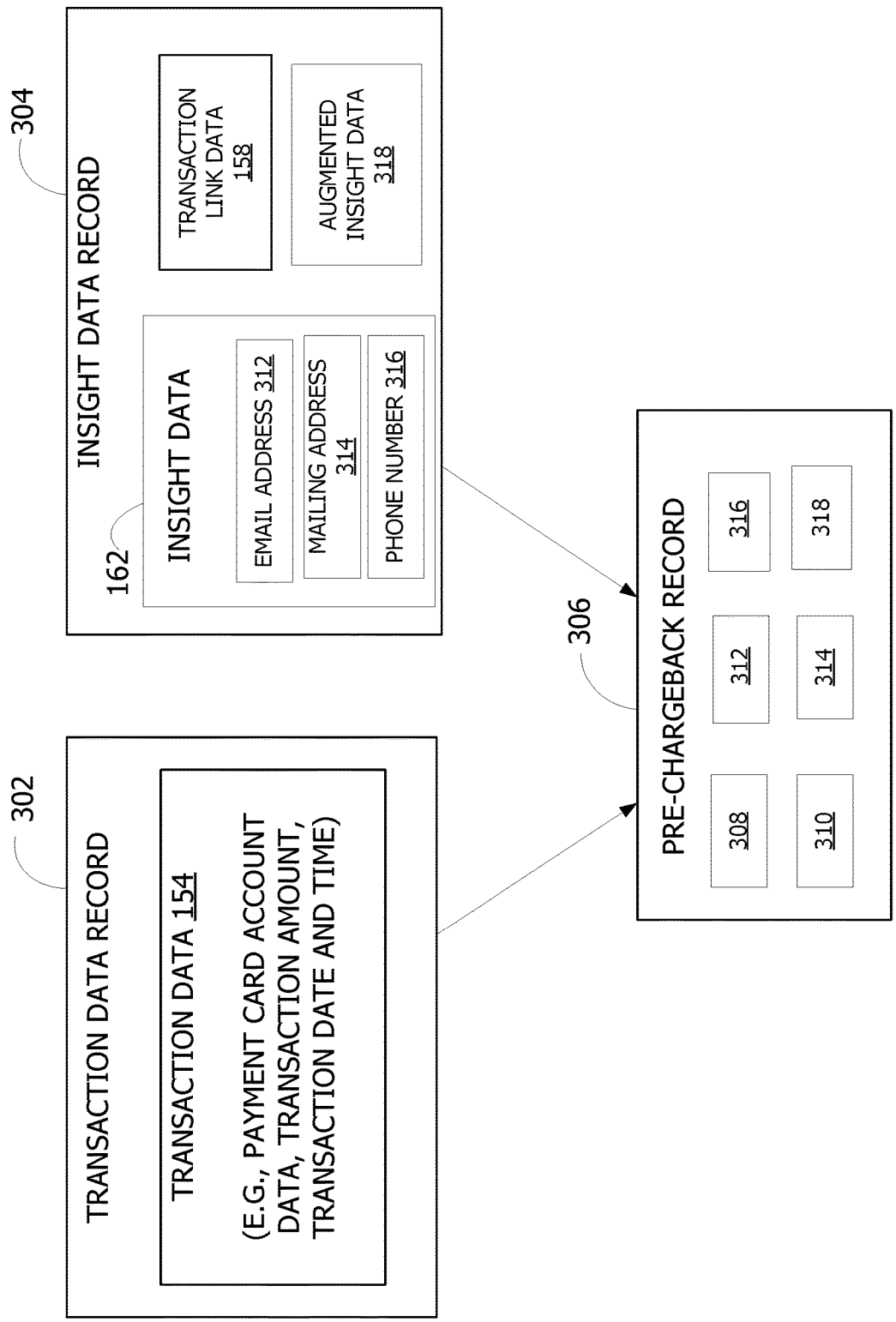

In the example embodiment, payment card processing network server 108 routes transaction data 154 associated with authorization request message 170 to historical transaction database 128 for storage as a transaction data records 302 (shown in FIG. 3). Each transaction data record 302 includes data associated with a particular transaction, such as the data exchanged during authorization, clearing, and/or settlement, and may include a unique transaction identifier corresponding to a specific payment card transaction.

In addition to the authorization process described above, IDI computing device 102 receives insight data message 166 via an insight communication channel that is separate and different from the payment card processing network described above. Third party processor 116 may transmit transaction data 154 to acquirer 110 and insight data message 166 to IDI computing device 102 simultaneously (or near-simultaneously).

In the example embodiment, insight data message 166 includes insight data 162 and transaction link data 158. Insight data 162 generally includes merchant-captured information 152 that is not required to be included in authorization request message 170, such as a customer telephone number, email address, and/or mailing address. Transaction link data 158 includes a portion of transaction data 154 included in authorization request message 170, such as a transaction identifier, and is used to link insight data 162 to one of transaction data records 302 in historical transaction database 128. IDI computing device 102 stores insight data 162 from insight data message 166 in insight database 126, along with transaction link data 158 and/or an indexing element generated from transaction link data 158.

In the example embodiment, IDI computing device 102 is in communication with a third party records database 130. IDI computing device 102 may be in communication with more than one third party records database 130, where each third party records database 130 is associated with a different third party provider. As described above, third party providers may be publically available services that provide additional information associated with a phone number or an email address. In the example embodiment, third party records database 130 is associated with a telephone identification provider. IDI computing device 102 parses insight data 162, such as the customer's phone number, email address, and/or mailing address, from respective data fields of the insight data message 166, and utilizes the parsed insight data 162 in a query to the at least one third party records database 130 to retrieve intelligence data 168 associated with insight data 162.

For example, intelligence data 168 may include location data, such as a GPS (Global Positioning System) location of the telephone number at the time of the customer's phone call to the merchant; an owner of the telephone number (e.g., full name and home address of the person who owns the telephone number); a phone line type (e.g., landline, cellular, Voice Over Internet Protocol (VoIP)); a phone type (e.g., prepaid, postpaid, residential); phone carrier information (e.g., carrier name); phone number status (e.g., whether a phone number is active, length of time in service, deactivated, suspended); and/or data regarding the mobile computing device used to make the call (e.g., an IMEI (International Mobile Equipment Identity) number, phone make, and phone model). For another example, intelligence data 168 may include data as to whether an email address provided by customer 104 is valid (e.g., does the email address exist), length of time in service, and data as to how risky the email address is (e.g., associated with spam, malware, and/or phishing). For another example, intelligence data 168 may include names and demographic information regarding past and current residents at a mailing address provided by the customer. IDI computing device 102 stores at least a portion of retrieved intelligence data 168 as augmented insight data 318 (shown in FIG. 3), along with insight data 162, in an insight data record 304 (shown in FIG. 3) for the specific transaction within insight database 126.

In the example embodiment, IDI computing device 102 includes at least one processor 122 for executing instructions and a memory 124 in communication with the at least one processor 122 for storing the executable instructions. Processor 122 may include one or more processing units (e.g., in a multi-core configuration). Memory 124 is any device allowing information such as executable instructions and/or other data to be stored and retrieved. Memory 124 may include one or more computer-readable media. Processor 122 is operatively coupled to a communication interface (not shown) such that IDI computing device 102 is capable of communicating with remote computing devices, such as third party processor 116, acquirer 110, payment card processing network server 108, a database server associated with third party records database 130, or another server computing device. IDI computing device 102 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Processor 122 also is operatively coupled to at least one database interface (not shown) such that IDI computing device 102 is capable of communicating with insight database 126 and historical transaction database 128.

Figure 2:
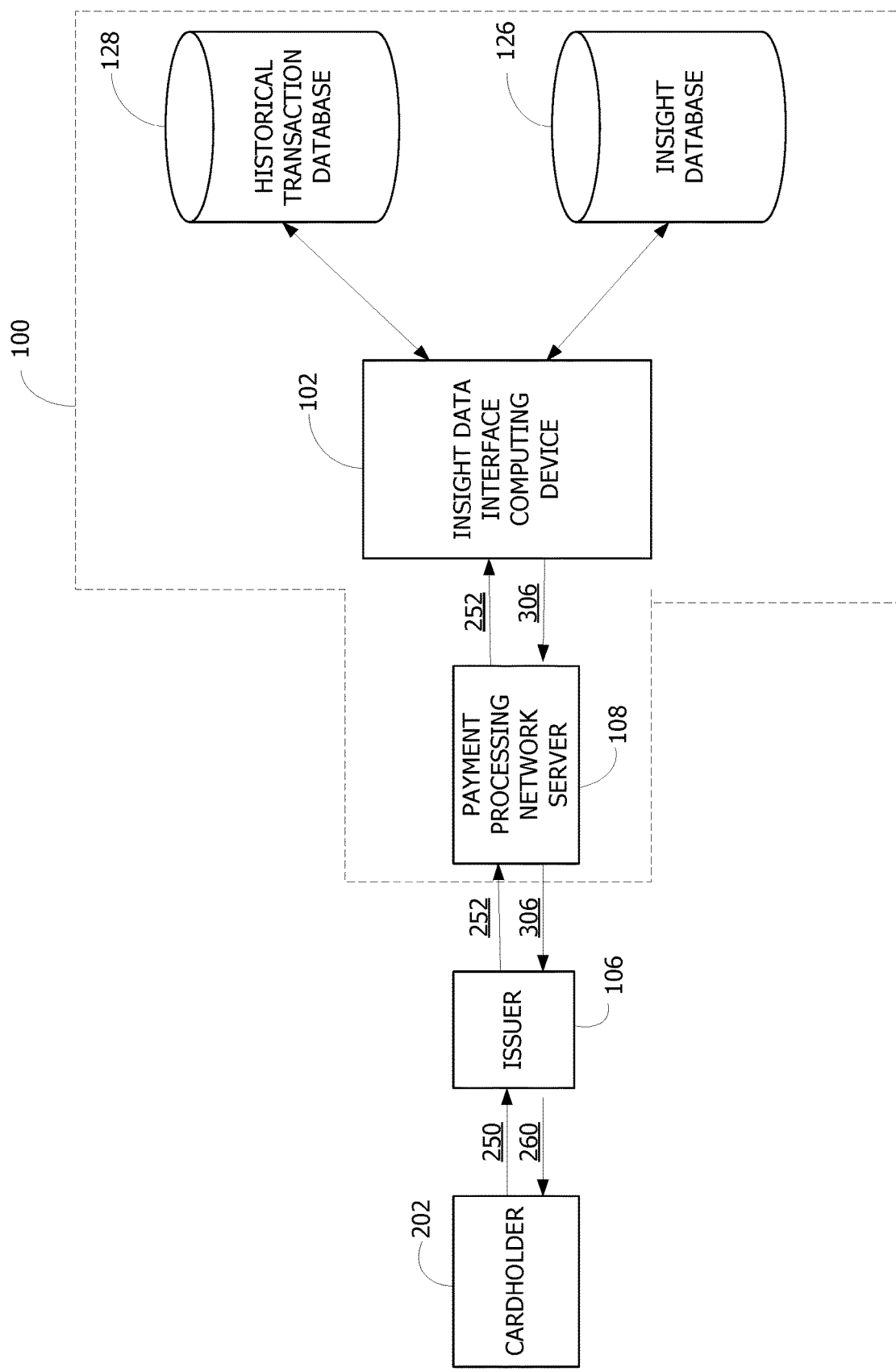

FIG. 2 is a flow diagram illustrating an example generation of a pre-chargeback record 306 through the payment card processing network using insight data computing system 100. FIG. 3 is a simplified block diagram illustrating an example structure of pre-chargeback record 306. In the example embodiment, a cardholder 202 contacts issuer 106 and initiates a dispute 250 of the previously completed payment card transaction (e.g., dispute 250 is initiated after the payment card transaction is settled). Cardholder 202 may or may not be customer 104 (shown in FIG. 1) depending, for example, on whether the payment card transaction was fraudulent. For example, if cardholder 202 purchased the good or service in question, cardholder 202 and customer 104 are the same person and the transaction is potentially legitimate. If customer 104 is not an authorized user of the payment card account of cardholder 202, the transaction is fraudulent. In the example embodiment, cardholder 202 initiates dispute 250 based on a line item in a billing statement provided to cardholder 202 by issuer 106, and issuer 106 uses an identifier of the line item identified by cardholder 202 to identify the payment transaction.

In response to dispute 250, rather than immediately initiating a conventional chargeback procedure, issuer 106 transmits a pre-chargeback retrieval request 252 to payment card processing network server 108 via the payment card processing network, and payment card processing network server 108 performs any suitable processing and forwards pre-chargeback retrieval request 252 to IDI computing device 102, for example via the Internet using an API call. Alternatively, issuer 106 transmits pre-chargeback retrieval request 252 directly to IDI computing device 102, for example via the Internet using an API call.

Pre-chargeback retrieval request 252 includes a transaction identifier that identifies the disputed payment transaction. For example, pre-chargeback retrieval request 252 includes the unique transaction identifier originally assigned by the payment card processing network during the authorization process, as described above. Issuer 106 may retrieve the transaction identifier based on the line item identified by cardholder 202 in dispute 250. Alternatively, pre-chargeback retrieval request 252 includes any suitable transaction identifier sufficient to identify the disputed payment transaction to the payment card processing network.

In the example embodiment, in response to pre-chargeback retrieval request 252, IDI computing device 102 generates pre-chargeback record 306. In particular, IDI computing device 102 queries historical transaction database 128 based on the transaction identifier included in pre-chargeback retrieval request 252, and retrieves the corresponding transaction data record 302. Likewise, IDI computing device 102 queries insight database 126 based on transaction link data 158 and retrieves the corresponding insight data record 304. IDI computing device 102 combines the data in transaction data record 302 and insight data record 304 to form pre-chargeback record 306 for transmission to issuer 106.

Alternatively, pre-chargeback record 306 is generated by IDI computing device 102 at any suitable prior time, such as in response to the initial storage of insight data 162 in insight database 126. Pre-chargeback record 306 is then stored in insight database 126, and IDI computing device 102 retrieves the previously generated pre-chargeback record 306 in response to pre-chargeback retrieval request 252.

Transaction data record 302 includes at least a portion of transaction data 154, such as payment card account data and transaction amount. Transaction data may further include a time stamp, date, and time associated with a particular payment card transaction, for example. Insight data record 304 includes transaction link data 158 and insight data 162, such as email address 312, mailing address 314, and/or phone number 316. Insight data record 304 also may include augmented insight data 318 that includes intelligence data 168 retrieved from third party records database 130 (shown in FIG. 1) for email address 312, mailing address 314, and/or phone number 316. IDI computing device 102 generates pre-chargeback record 306 by combining data from transaction data record 302 and insight data record 304. In some embodiments, in addition to transmitting pre-chargeback record 306 to issuer 106, IDI computing device 102 stores pre-chargeback record 306 in insight database 126 separately from the underlying transaction data record 302 and insight data record 304. Alternatively, IDI computing device 102 uses the link between insight data record 304 and transaction data record 302 to re-generate pre-chargeback record 306 as needed. In some embodiments, pre-chargeback record 306 includes less than all of the data from records 302 and 304. For example, pre-chargeback record 306 excludes transaction link data 158 as redundant to transaction data 154.

In the example embodiment, in response to pre-chargeback retrieval request 252 received from payment card processing network server 108, IDI computing device 102 transmits pre-chargeback record 306 to payment card processing network server 108. Payment card processing network server 108 forwards pre-chargeback record 306 to issuer 106 via the payment card processing network. Alternatively, IDI computing device 102 transmits pre-chargeback record 306 directly to issuer 106, such as via the Internet. Issuer 106 reviews the data in pre-chargeback record 306 to evaluate a likelihood that the underlying payment transaction is legitimate, and transmits a dispute response 260 to cardholder 202. For example, if issuer 106 finds that intelligence data 168 is consistent with cardholder 202 placing a legitimate telephone order, issuer 106 may decide not to pursue the conventional chargeback procedure via the payment card processing network, thereby preserving messaging bandwidth and computing resources of the payment processing network that would have been committed to a conventional chargeback procedure, improving overall system performance. For another example, if issuer 106 finds that intelligence data 168 is inconsistent with cardholder 202 placing a legitimate telephone order, issuer 106 may decide to pursue the conventional chargeback procedure via the payment card processing network, and a speed of the conventional chargeback procedure is improved due to the reduced number of conventional chargeback procedures initiated.

Figure 4:
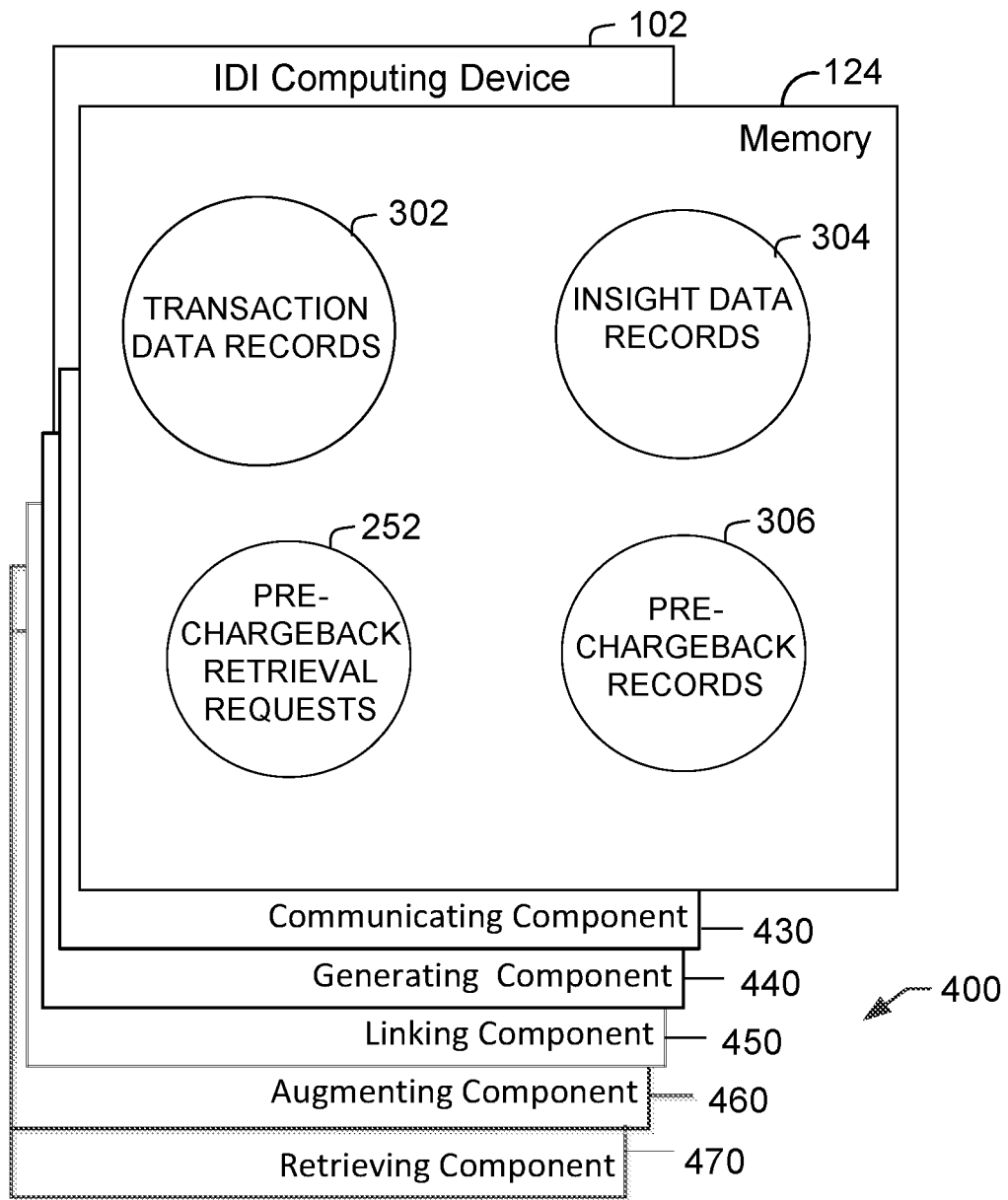

FIG. 4 depicts a diagram of components 400 of an example IDI computing device 102. IDI computing device 102 includes memory 124 configured to store various information which may be obtained from communication with, for example, insight database 126, historical transaction database 128, payment processing network server 108, and third party processor 116 (shown in FIG. 1). Memory 124 may be coupled with several separate components within IDI computing device 102 which perform specific tasks. In the illustrated embodiment, memory 124 is divided into a plurality of sections and stores, including but not limited to, transaction data records 302, insight data records 304, pre-chargeback retrieval requests 252, and pre-chargeback records 306.

With reference to FIGS. 1-4, in the example embodiment, components 400 include a communicating component 430 configured to receive insight data messages 166 via an insight communication channel other than the payment card processing network. Insight data message 166 includes insight data 162 and transaction link data 158. Communicating component 430 is further configured to transmit, in response to pre-chargeback retrieval request 252, pre-chargeback record 306.

Components 400 further include a linking component 450 configured to link insight data 162 within insight database 126 to transaction data 154 within historical transaction database 128 by matching transaction link data 158 in insight data message 166 to transaction data 154 in historical transaction database 128. Components 400 also include a generating component 440 configured to generate pre-chargeback record 306 including the transaction data and the linked insight data. Pre-chargeback record 306 may include data associated with a customer's mobile computing device, such as a merchant-captured phone number, customer call-back number, and/or phone intelligence data. In other embodiments, pre-chargeback record 306 includes data associated with additional customer-provided information, such as an email address and/or a mailing address.

Components 400 may further include a retrieving component 470 configured to retrieve intelligence data 168 related to insight data 162 (e.g., the customer's mobile computing device, phone number, email address, and/or mailing address) from third party records database 130. Components 400 may further include an augmenting component 460 to update pre-chargeback record 306 with augmented insight data 318 based on intelligence data 168.

As will be appreciated based on the foregoing specification, the above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed examples of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

For example, one or more computer-readable storage media may include computer-executable instructions embodied thereon for determining the probability of an authorized transaction resulting in a chargeback. In this example, the computing device may include a memory device and a processor in communication with the memory device, and when executed by said processor the computer-executable instructions may cause the processor to perform a method such as the method described and illustrated in the example of FIG. 5.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

This written description uses examples to describe embodiments of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An insight data interface (IDI) computing system for generating a pre-chargeback record for a payment transaction between a customer and a merchant, wherein the payment transaction is authorized over a payment processing network based on transaction data submitted over the payment processing network, wherein the transaction data is included in an authorization message submitted via the payment processing network and stored by the payment processing network in a transaction data record in a historical transaction database, the DI computing system comprising an insight data interface (IDI) computing device comprising:

a memory device for storing data; and at least one processor communicatively coupled to the memory device, the at least one processor programmed to:

receive, via an insight communication channel other than the payment processing network, an insight data message including insight data and transaction link data, wherein the insight data is collected by the merchant during the payment transaction and includes at least one of a telephone number of the customer and an email address of the customer, and wherein the transaction link data matches at least one data field in the transaction data record associated with the payment transaction;

store the insight data in an insight data record in an insight database;

link the insight data record in the insight database to the transaction data record in the historical transaction database by matching the transaction link data in the insight data message to the transaction data record;

receive a pre-chargeback retrieval request from an issuer computing device associated with an issuer of a payment card account, wherein the pre-chargeback retrieval request includes a transaction identifier identifying a disputed payment transaction;

in response to receiving the pre-chargeback retrieval request, query the historical transaction database using the transaction identifier to retrieve the transaction data record associated with the disputed payment transaction, wherein the retrieved transaction data record includes the at least one data field;

query the insight database for the transaction link data that matches the at least one data field in the retrieved transaction data record to retrieve the linked insight data record;

in response to retrieving the transaction data record and the linked insight data record, generate the pre-chargeback record by combining the transaction data record and the linked insight data record, wherein the pre-chargeback record (a) indicates whether the disputed payment transaction is legitimate, (b) is generated to respond to the pre-chargeback retrieval request, and (c) includes the transaction data record and the linked insight data record, and wherein the transaction data record includes fraud-related data associated with the disputed payment transaction processed over the payment processing network; and transmit the pre-chargeback record including the combination of the transaction data record and the linked insight data record to the issuer.

2. The DI computing system of claim 1, wherein the at least one processor is further programmed to:

query a third-party records database for records that include the insight data;

receive, in response to the query, augmented insight data; and update the linked insight data record in the insight database to include the augmented insight data, wherein the generated pre-chargeback record includes the augmented insight data.

3. The DI computing system of claim 2, wherein the insight data is the telephone number of the customer, and wherein the augmented insight data includes location data of a mobile computing device associated with the telephone number during the payment transaction.

4. The DI computing system of claim 2, wherein the insight data is the email address of the customer, and wherein the augmented insight data includes data as to whether the email address is valid.

5. The DI computing system of claim 1, wherein the at least one processor is configured to receive the insight data message via the insight communication channel by receiving an API call generated by a web page.

6. The DI computing system of claim 1, further comprising a payment processing network server programmed to:

receive, via the payment processing network, an authorization request message including the transaction data, the transaction data including an account identifier of the payment card account, a transaction amount, and a transaction time stamp;

transmit, via the payment processing network, the authorization request message to the issuer;

receive, from the issuer via the payment processing network in response to the authorization request message, an authorization response message authorizing the payment transaction;

store, in the transaction data record in the historical transaction database, the transaction data;

receive, from the issuer subsequent to authorization of the payment transaction, the pre-chargeback retrieval request identifying the payment transaction; and transmit, to the issuer in response to the pre-chargeback retrieval request, the pre-chargeback record for the payment transaction.

7. The IDI computing system of claim 6, wherein when the payment transaction is determined to be illegitimate based on an evaluation of the pre-chargeback record by the issuer, the payment processing network server is further programmed to receive, from the issuer via the payment processing network subsequent to the issuer evaluating the pre-chargeback record, a chargeback for the payment transaction.

8. A computer-implemented method for generating a pre-chargeback record for a payment transaction between a customer and a merchant using an insight data interface (IDI) computing device comprising at least one processor communicatively coupled to a memory device, wherein the payment transaction is authorized over a payment processing network based on transaction data submitted over the payment processing network, wherein the transaction data is included in an authorization message submitted via the payment processing network and stored by the payment processing network in a transaction data record in a historical transaction database, the method comprising:

receiving, at the IDI computing device, via an insight communication channel other than the payment processing network, an insight data message including insight data and transaction link data, wherein the insight data is collected by the merchant during the payment transaction and includes at least one of a telephone number of the customer and an email address of the customer, and wherein the transaction link data matches at least one data field in the transaction data record associated with the payment transaction;

storing the insight data in an insight data record in an insight database;

linking, by the IDI computing device, the insight data record in the insight database to the transaction data record in the historical transaction database by matching the transaction link data in the insight data message to the transaction data record;

receiving, by the IDI computing device, a pre-chargeback retrieval request from an issuer computing device associated with an issuer of a payment card account, wherein the pre-chargeback retrieval request includes a transaction identifier identifying a disputed payment transaction;

in response to receiving the pre-chargeback retrieval request, querying, by the IDI computing device, the historical transaction database using the transaction identifier to retrieve the transaction data record associated with the disputed payment transaction, wherein the retrieved transaction data record includes the at least one data field;

querying, by the IDI computing device, the insight database for the transaction link data that matches the at least one data field in the retrieved transaction data record to retrieve the linked insight data record;

in response to retrieving the transaction data record and the insight data record, generating, by the IDI computing device, the pre-chargeback record by combining the transaction data record and the linked insight data record, wherein the pre-chargeback record (a) indicates whether the disputed payment transaction is legitimate, (b) is generated to respond to the pre-chargeback retrieval request, and (c) includes the transaction data record and the linked insight data record, and wherein the transaction data record includes fraud-related data associated with the disputed payment transaction processed over the payment processing network; and transmitting, by the MI computing device, the pre-chargeback record including the combination of the transaction data record and the linked insight data record to the issuer.

9. The computer-implemented method of claim 8 further comprising:
   querying a third-party records database for records that include the insight data;
   receiving, in response to the query, augmented insight data; and
   updating the linked insight data record in the insight database to include the augmented insight data, wherein the generated pre-chargeback record includes the augmented insight data.

10. The computer-implemented method of claim 9, wherein the insight data is the telephone number of the customer, and wherein the augmented insight data includes location data of a mobile computing device associated with the telephone number during the payment transaction.

11. The computer-implemented method of claim 9, wherein the insight data is the email address of the customer, and wherein the augmented insight data includes data as to whether the email address is valid.

12. The computer-implemented method of claim 8, wherein receiving the insight data message via the insight communication channel further comprises receiving the insight data message via the insight communication channel by receiving an API call generated by a web page.

13. The computer-implemented method of claim 8 further comprising:
   receiving, via the payment processing network, an authorization request message including the transaction data, the transaction data including an account identifier of the payment card account, a transaction amount, and a transaction time stamp;
   transmitting, via the payment processing network, the authorization request message to the issuer;
   receiving, from the issuer via the payment processing network in response to the authorization request message, an authorization response message authorizing the payment transaction;
   storing, in the transaction data record in the historical transaction database, the transaction data;
   receiving, from the issuer subsequent to authorization of the payment transaction, the pre-chargeback retrieval request identifying the payment transaction; and
   transmitting, to the issuer in response to the pre-chargeback retrieval request, the pre-chargeback record for the payment transaction.

14. The computer-implemented method of claim 13, wherein when the payment transaction is determined to be illegitimate based on an evaluation of the pre-chargeback record by the issuer, the method further comprises receiving, from the issuer via the payment processing network subsequent to the issuer evaluating the pre-chargeback record, a chargeback for the payment transaction.

15. One or more non-transitory computer-readable storage media that includes computer-executable instructions for generating a pre-chargeback record for a payment transaction between a customer and a merchant, wherein the payment transaction is authorized over a payment processing network based on transaction data submitted over the payment processing network, wherein the transaction data is included in an authorization message submitted via the payment processing network and stored by the payment processing network in a transaction data record in a historical transaction database, wherein when executed by an insight data interface (IDI) computing device, the computer-executable instructions cause the DI computing device to:
   receive, via an insight communication channel other than the payment processing network, an insight data message including insight data and transaction link data, wherein the insight data is collected by the merchant during the payment transaction and includes at least one of a telephone number of the customer and an email address of the customer, and wherein the transaction link data matches at least one data field in the transaction data record associated with the payment transaction;
   store the insight data in an insight data record in an insight database;
   link the insight data record in the insight database to the transaction data record in the historical transaction database by matching the transaction link data in the insight data message to the transaction data record;
   receive a pre-chargeback retrieval request from an issuer computing device associated with an issuer of a payment card account, wherein the pre-chargeback retrieval request includes a transaction identifier identifying a disputed payment transaction;
   in response to receiving the pre-chargeback retrieval request, query the historical transaction database using the transaction identifier to retrieve the transaction data record associated with the disputed payment transaction, wherein the retrieved transaction data record includes the at least one data field;
   query the insight database for the transaction link data that matches the at least one data field in the retrieved transaction data record to retrieve the linked insight data record;
   in response to retrieving the transaction data record and the insight data record, generate the pre-chargeback record by combining the transaction data record and the linked insight data record, wherein the pre-chargeback record includes the transaction data record and the linked insight data record, and wherein the transaction data record (a) indicates whether the disputed payment transaction is legitimate, (b) is generated to respond to the pre-chargeback retrieval request, and fs) includes fraud-related data associated with the disputed payment transaction processed over the payment processing network; and
   transmit the pre-chargeback record including the combination of the transaction data record and the linked insight data record to the issuer.

16. The at least one or more non-transitory computer-readable storage media of claim 15, wherein the computer-executable instructions further cause the DI computing device to:
   query a third-party records database for records that include the insight data;
   receive, in response to the query, augmented insight data; and
   update the linked insight data record in the insight database to include the augmented insight data, wherein the generated pre-chargeback record includes the augmented insight data.

17. The one or more non-transitory computer-readable storage media of claim 16, wherein the insight data is the telephone number of the customer, and wherein the augmented insight data includes location data of a mobile computing device associated with the telephone number during the payment transaction.

18. The one or more non-transitory computer-readable storage media of claim 15, wherein receiving the insight data message via the insight communication channel comprises receiving an API call generated by a web page.

19. The one or more non-transitory computer-readable storage media of claim 15, wherein the computer-executable instructions further cause the IDI computing device to:
- receive, via the payment processing network, an authorization request message including the transaction data, the transaction data including an account identifier of the payment card account, a transaction amount, and a transaction time stamp;
- transmit, via the payment processing network, the authorization request message to the issuer;
- receive, from the issuer via the payment processing network in response to the authorization request message, an authorization response message authorizing the payment transaction;
- store, in the transaction data record in the historical transaction database, the transaction data;
- receive, from the issuer subsequent to authorization of the payment transaction, the pre-chargeback retrieval request identifying the payment transaction; and
- transmit, to the issuer in response to the pre-chargeback retrieval request, the pre-chargeback record for the payment transaction.

20. The one or more non-transitory computer-readable storage media of claim 19, wherein when the payment transaction is determined to be illegitimate based on an evaluation of the pre-chargeback record by the issuer, a payment processing network server associated with the payment processing network is further programmed to receive, from the issuer via the payment processing network subsequent to the issuer reviewing the pre-chargeback record, a chargeback for the payment transaction.

\* \* \* \* \*